Oct. 18, 1938.  R. E. LASSITER  2,133,548
AUTOMATIC TRANSMISSION CONTROL
Filed Dec. 10, 1934   2 Sheets-Sheet 2

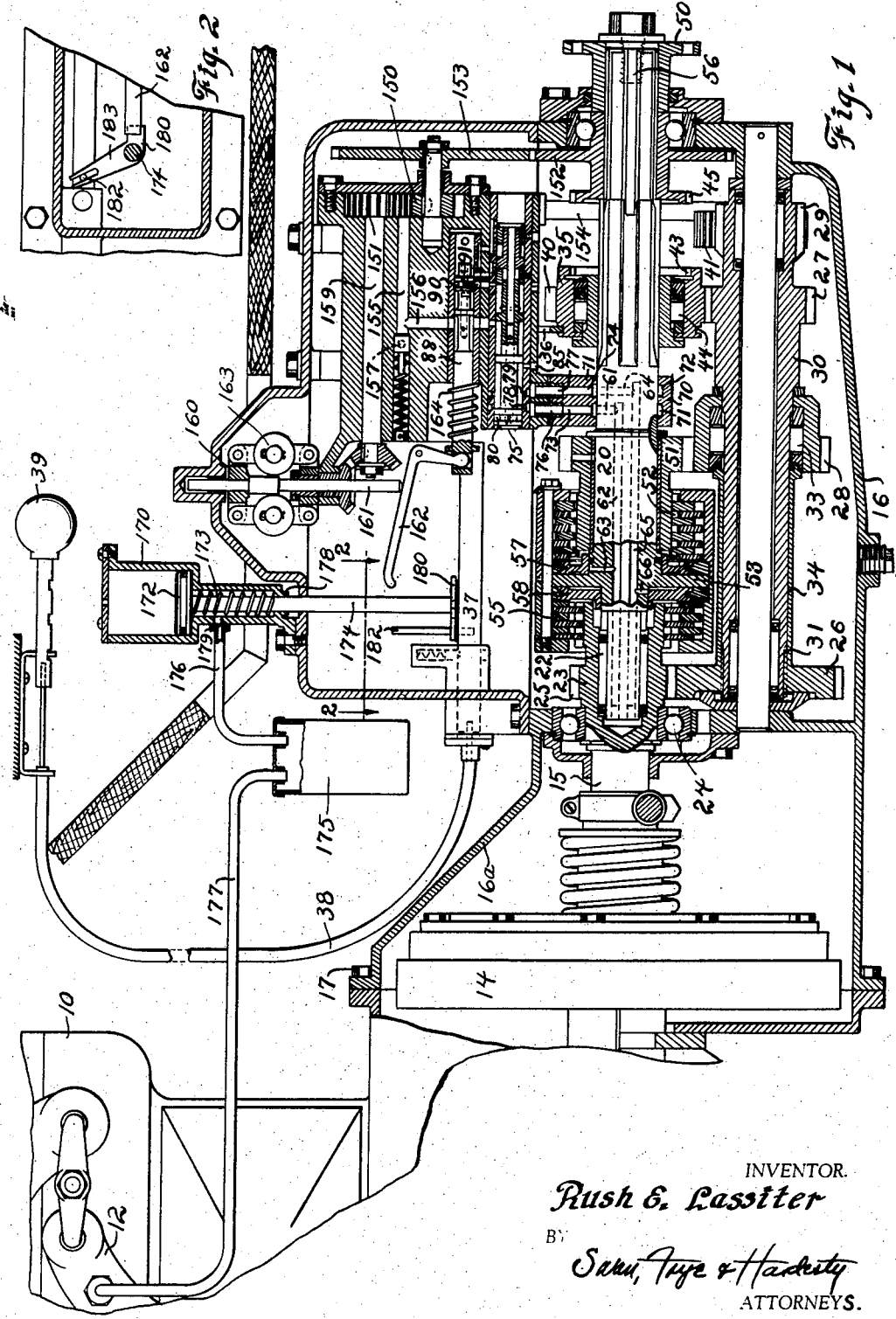

INVENTOR.
Rush E. Lassiter
BY
Swan, Type & Hardesty
ATTORNEYS.

Patented Oct. 18, 1938

2,133,548

UNITED STATES PATENT OFFICE 2,133,548

AUTOMATIC TRANSMISSION CONTROL

Rush E. Lassiter, Detroit, Mich., assignor to The Monopower Corporation, Detroit, Mich., a corporation of Michigan Application December 10, 1934, Serial No. 756,903

8 Claims. (Cl. 74—336.5)

This invention relates to automatic transmissions for controllingly varying the torque and speed ratios between driving and driven elements, and is particularly concerned with controlling the power transmitted by explosion engines as they are used in the driving of motor vehicles as well as in other services, in accordance with torque and speed demands and conditions. The transmissions of this character most widely used in motor cars up until the present day have been arranged for direct manual control by the driver, usually through the agency of a simple shifting lever. Numerous designs and constructions have been suggested providing for automatic shifting, in an effort to eliminate the necessity for performing this operation manually, as well as to enable removal of the shifting lever from its usually obstructing position in the driver's compartment. Other benefits sought to be attained by automatic control are smoother operation, and elimination of the danger of stripping gears through inexpert operation. All of those mentioned also constitute objects of this invention.

Numerous difficulties have been encountered in the various attempts to reduce such automatic transmissions to practicable and marketable form, however. In addition to the problem of cost, that of providing automatic control sufficiently responsive to all conditions has been a troublesome obstacle. A primary object of this invention, therefore, is to provide improved and extremely flexible controlling means for such an automatic transmission, which controlling means is not only of simple and inexpensive construction in itself, but involves no complication of the transmission to which it is applied, is usable in connection with transmissions of various if not of virtually any desired construction, and provides simple means whereby the shifting of transmission ratios may be governed responsively not only to the speed but also to the torque demand or load upon the engine.

Still another object is the arrangement of the controlling means in such manner that while shifting of the effective driving ratio may normally be governed in response only to speed changes of the vehicle or driven shaft, an undue torque demand results in changing the operation of the governing means, under the influence of my improved automatic controlling system, in a manner adapted to establish and/or maintain a higher torque drive during the period of increased torque demand.

Still further I aim to provide in conjunction with my invention simple means for preventing unduly rapid or fluttering operation of the controlling mechanism in event of erratic operation of the engine.

Still another object is the provision of simple means for controlling the operation of an automatic transmission in accordance with torque demands upon the prime mover under the direct regulation of pressure variances created in the prime mover by variation of such torque demand.

Other objects and advantages will be apparent from the following description wherein reference is made to the accompanying drawings illustrating preferred embodiments of my invention, and wherein similar reference numerals designate similar parts throughout the several views.

In the drawings:

Figure 1 is a somewhat diagrammatic vertical sectional elevation of the transmission of a motor car, incorporating a preferred embodiment of my controlling means and fragmentarily showing the engine and other appurtenant portions of the vehicle;

Figure 2 is a detail cross section taken substantially on the line 2—2 of Figure 1 and looking in the direction of the arrows.

Figure 3:
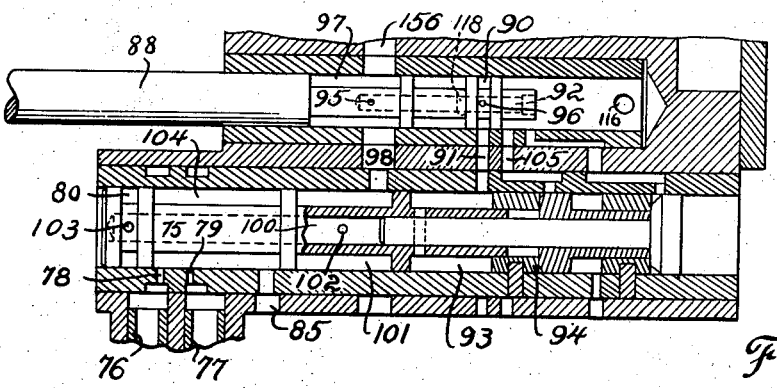
Figures 3, 4 and 5 are enlarged diagrammatic sectional views of the controlling valve mechanism, showing the same in different positions assumed thereby in operation.

Referring now to the drawings, reference character 10 designates generally a gasoline or other internal combustion engine, the intake manifold of which is indicated at 12. Through a main clutch 14 the engine drives a shaft 15 to which is directly connected an automatic transmission, housed in a casing 16 and supported by a forward casing bell 16a which also serves as a clutch housing and is bolted as at 17 to the rear wall of the crank case of the engine.

Although the torque converting mechanism of the transmission forms no part of my present invention, and in fact conforms to disclosure of patent application Serial No. 706,232, filed January 11, 1934, by Robert B. Aspinwall, such mechanism will nevertheless be briefly described herein in order that the operation of my improved controlling mechanism may be understood:

The transmission shaft 20 is piloted and rotatable at its forward end, as in roller bearing 22, in driving sleeve portion 23 forming a continuation of drive shaft 15. These parts are journaled in the front wall of the transmission casing as in anti-friction bearing 24. Main gear 25 carried by drive sleeve 23 meshes with main countershaft gear 26. Through these gears are drivable, the low, intermediate and reverse countershaft gears 27—28—29 respectively. The low speed and reverse gears 27—29 are rotatable as a unit with main gear 26, to which they are connected by interfitted splines as at 31 through the countershaft sleeve 30, with which said gears are integrally formed. Intermediate gear 28 is drivable through an over-running clutch 33 arranged in its hub, and connected to main gear 26 through integral sleeve 34.

The transmission shaft 20 carries slidably splined upon its rear extremity a gear and overrunning clutch assembly generally designated 35, movable longitudinally along the shaft by means of shifter fork 36, manually operable through shifter rail 37 which may be controlled as through the agency of a Bowden wire 38 from a dash control assembly 39. By this means the gear portion 40 may be moved to engage either the low speed gear 27, with which it is shown meshed in the drawings, or coupled through reverse idler 41 to counter-shaft reverse gear 29 by sliding it to an extreme rearward position, at which time the lockout clutch teeth 43 render the overrunning clutch 44 in the hub of the gear ineffective by engaging the cooperating clutch teeth 45 carried by the driven coupling member 50. The gear and overrunning clutch assembly 35 may also be moved to an intermediate neutral position in which the gear 40 meshes with neither of the gears 27—41.

Intermediate counter-shaft gear 28 meshes with a second speed gear 51 carried by the transmission shaft and normally running free thereon but adapted to be coupled to said shaft through the agency of a fluid operable multiple disc friction clutch 52. The driven web 53 of this clutch is shown as formed integrally with the transmission shaft and as also constituting the driven member of another similar clutch 55 arranged upon the opposite side thereof and adapted when engaged to directly couple the drive sleeve 23 to the transmission shaft 20, and thus establish direct drive, since the driven coupling 50 is directly keyed to the transmission shaft as by splined connections 56. The pressure plates 57—58 of clutches 52—55 constitute the pistons of fluid pressure applying motors independently operable through oil channels drilled in the transmission shaft; channels 61—62—63 providing the fluid connection for actuating the clutch 52, while fluid passages 64—65—66 similarly conduct the motivating fluid to and from the operating motor of clutch 55.

It will be seen that when both clutches 52—55 are disengaged, a low speed drive is effective through the counter-shaft to gear 40, and thence to the driven coupling, if said gear is meshed with the low speed gear 27, (as it is shown in the drawings). Similarly, with both clutches disengaged, neutral or reverse may be established by moving assembly 35 to either intermediate or rearmost position. Upon the engagement of clutch 52, however, which normally occurs in proper sequence after the vehicle attains a desired speed in low gear, driving connection to the transmission shaft and so the rear wheels through coupling 50 is established through gears 28—51 and clutch 52, overrunning clutch 33 locking in this direction. The intermediate drive thus established being of higher speed than the low speed drive imparted to gear 40, overrunning clutch 44 releases and overruns that gear.

Upon engagement of clutch 55 to establish direct drive, overrunning clutch 33 will of course release in similar fashion to allow the transmission shaft to overrun in event clutch 52 is not instantly released.

Fluid for moving clutch actuating pistons 57—58 is supplied to ports 61—64 through a manifold element 70 containing annular manifold channels 71—72 encircling and in sealed engagement at their edges with shaft 20, and covering respectively the orbits of radial supply passages 61—64. The fluid is fed to the manifold connecting passages 73—74 through slip couplings 76—77 providing connection with valve outlet ports 78—79. The controlled delivery of motivating fluid to these ports is effected through control valve 75, the delivery passage 80 of which is movable from the blanked position in which it is shown in Figures 1 and 3 into registry with either of said ports 78, 79 or with relief port 85, in progressive stepped movements to the right, as viewed in the drawings. Movement of the valve is induced by fluid pressure under the control of a pilot valve 88 whose delivery chamber 90 when in the extreme left position shown, registers with port 91 to provide communication through the central passage 92 of the valve to chamber 93 of control valve 75, wherein the reaction of the fluid pressure against the fixed wall 94 maintains the control valve in the left hand position in which it is shown in Figures 1 and 3.

Figure 4:
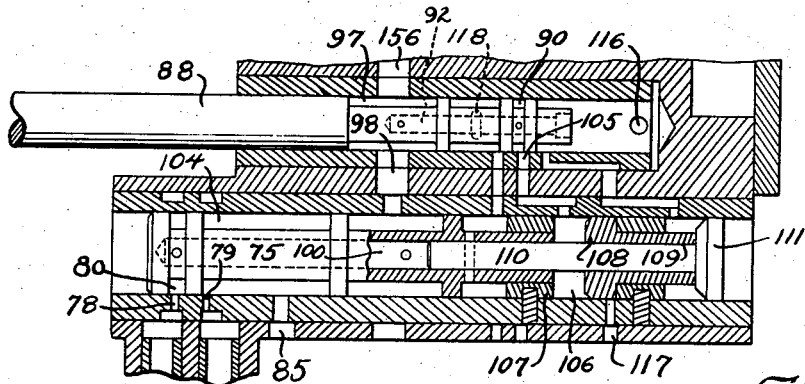

The fluid will be seen to be delivered to valve 88 through oil channel 156, to which it is supplied under pressure from pump means presently to be described. Simultaneously with its delivery to chamber 93 through central passage 92 and the feeding and outlet ports 95—96 thereof respectively, fluid passes through chamber 97 of valve 88 to the delivery passage 80 of valve 75, to which it is conducted through communicating ports 98 connecting the valve bodies, chamber 101 of valve 75, and central passage 100 of that valve, to and from which the fluid is delivered through inlet and outlet openings 102—103 formed in the valve body within chambers 101 and 80 respectively. It will be seen that when both valves 75—88 are in the left-most position, as shown in Figure 3, the pressure channels to both clutches 52—55 are connected to atmosphere by the chamber 104 of valve 75, which provides connection between the ports 78—79 leading to the clutches, and a relief port 85, open to the atmosphere within the casing. Upon movement of the pilot valve 88 one step to the right, however, to register its discharge chamber 90 with port 105, the pressure fluid passing through such port and the communicating passages, as best shown in Figure 4, is delivered to the space designated 106 between the fixed wall 107 and head 108 of a slidable collar 109 fitted on a stem 110 secured to and projecting axially from the end of valve 75. The collar may be seen to be slidable with relation to both the valve stem and casing, but the length of the collar is such that delivery of fluid to chamber 106 in the manner described, in moving the collar to the right, forces its end against a head 111 carried by the valve stem 110. Movement of the collar in this manner thus also moves the entire valve 75 to the right a like distance.

Figure 5:
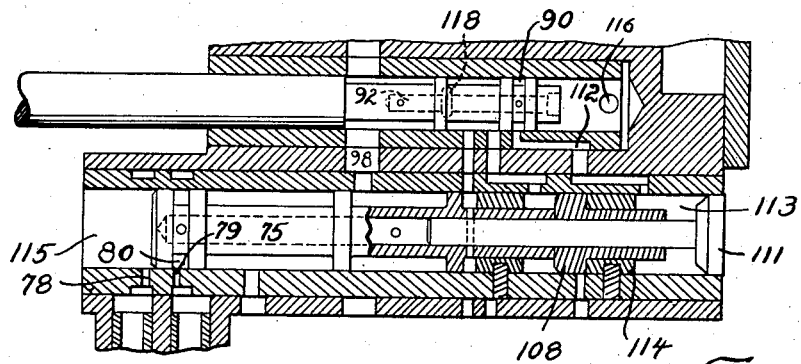

Fluid is at the same time delivered from valve inlet 156 to connecting port 98 through valve chamber 97, whence it passes to the discharge passage 80 of valve 75 through the central passage 100, and is by the discharge chamber delivered to port 78 communicating through the channels previously described with the actuating motor of intermediate drive clutch 52. The consequent engagement of this clutch establishes intermediate speed drive, as above described. Such drive is maintained until the speed of the governing mechanism (presently to be described) is sufficient to move the pilot valve 88 another step to the right and register its discharge chamber 90 with another port 112, as best shown in Figure 5. Upon such registry fluid is delivered through this port to the chamber 113 provided between the fixed abutment 114, which limits the extreme movement of the valve 75, blocking the heads 108—111, and by pressure against the head 111 moves the control valve to the right to the extreme position shown in Figure 5, at which time the pressure fluid is delivered from outlet chamber 80 of that valve to the direct drive clutch 55, through port 79 with which chamber 80 is then registered, and the communicating passages previously described.

It will be noted that when the valves are in position to energize the intermediate speed clutch, as shown in Figure 4, direct drive clutch 55 is deenergized by connection of its supply port 79 with relief port 85 through valve chamber 104, while when in the direct drive position shown in Figure 5, clutch 52 is deenergized by connection through port 78 with the atmosphere via the space designated 115 left unoccupied by the movement of the valve to the right.

Relief ports as 116, 117, and 118, open to the atmosphere within the casing, are provided for venting the chambers 106—113.

The pilot valve 88 will be seen to at no time oppose delivery of pressure fluid to the delivery chamber 80 of control valve 75, but to function merely to move the latter valve to the several described positions. In the left-most position of the control valve, in which it is shown in Figures 1 and 3, both clutches 52—55 are deenergized, and the only effective drive may be had through gear 40, if the latter is in mesh with either of the gears 27—41, while progressive movement of the control valves to the right establishes the second and direct drives successively in the manner described.

The pumping mechanism comprises a gear pump, the gears of which are designated 150—151, drivable through gears 152—153, the former carried by the driven shaft. The pump draws oil from the bottom of the casing through inlet pipe 154, and delivers it through outlet passage 155 to the supply channel 156 of the valving mechanism previously described. Constant pressure fluid supply is maintained by a relief valve 157.

Driven by the propeller shaft through a connection with one of the pumping gears (151), furnished by the shaft 159 of the latter, is a centrifugal governor assembly 160 arranged to upon increase of speed depress the governor shaft 161. The governor shaft rests upon a valve operating lever 162, which is formed as a bell crank adapted to directly move the pilot valve 88, as clearly shown in the drawings. The valve and actuating lever and governor shaft are yieldably held in raised position, and the flyweights 163 urged inwardly, by a compression spring 164 trapped upon the stem of the valve and urging it to the left as viewed in the drawings. The flyweights acting through their supporting linkage are of course so balanced against the centrifugal force developed by the flyweights when rotated at the speeds induced by operation of the vehicle throughout its intended speed range, as to move the valve to the second and third positions previously described upon attainment of predetermined rates of speed by the vehicle, provided such valve movement is not prevented or reversed by the suction torque control mechanism now to be described:

Carried upon the top of the casing, in the shown construction, is a vacuum cylinder 170 within which is vertically reciprocable a piston 172 yieldably urged upwardly by a spring 173 encircling the piston rod 174, which projects downwardly and into the transmission casing. The upward force of the spring is opposed by reduction of pressure below the piston, which is designed to be effected in response to a pressure drop in the intake manifold of the engine, to which the chamber beneath the piston is connected as by tubes 176—177. The chamber beneath the piston also houses spring 173, and is of course virtually sealed to the stem 174, as by closely fitting the slidable bearing support to the rod at the lower extremity of the housing, (at 178). The tube 176 communicates with the chamber beneath the piston through a port 179, and a tank 175 is interposed in the vacuum line between the vacuum cylinder and intake manifold to act as a delaying agent relative to predetermined flow capacity of the conduits adapted to prevent sudden and quickly changing pressure variances from directly affecting the piston, thereby preventing erratic reciprocation of the rod 174. The spring 173 is so balanced with respect to the normal vacuum or pressure drop induced in the intake manifold of the engine as to elevate the piston only when the pressure drops lower than is normal.

Carried by the lower extremity of rod 174 within the transmission casing is a blocking arm 180. Such arm normally moves in a path in vertical alignment with the path of the end of lever 162, so that upon elevation of rod 174 and consequently of arm 180, induced by vacuum drop, the downward movement of valve actuating lever 162, and consequent shifting of the pilot valve to a higher speed position (farther to the right), are blocked or opposed by the added resistance of spring 173, which upon occasion may also be effective, as will be apparent, to return the valve to a lower speed position. The arm 180 may be swingable away from its normal blocking position concurrently with movement of manually shiftable element 35 away from forward toward neutral or reverse position. The movement of the arm out of normal blocking position is effected through the shifter rail 37, which swings the arm through the agency of a vertical actuating rod 182 carried by and upstanding from the rail and slidably fitted in the slotted end of an angular arm 183 formed integrally with blocking arm 180. These parts are so disposed, as best shown in Figure 2, that movement of the shifter rail to slide the unit 35 away from forward drive position to neutral or reverse results in swinging the blocking arm out of the path of the valve actuating lever, preventing any interference with movement of the pilot valve under the control of the governor while the gear 40 is in neutral position. By virtue of this arrangement the engine may be cranked by towing the car, or by its momentum when rolling free, since the pump and governor mechanism, being operated by the driven shaft, tend to function in their normal manner during forward movement of the vehicle regardless of the position of gear 40. When the engine is stopped, however, piston 172 and blocking arm 180 are elevated, and accordingly would interfere with the pilot valve operating arm 162 while gear 40 was in neutral were it not for the fact that the blocking arm is moved clear of the path of the operating lever, as above stated, concurrently with movement of gear 40 to the neutral position. It will be seen therefore that under such conditions, with the slidable gear in neutral position, the governor will cause engagement of clutches 52—55 upon the vehicle reaching the predetermined speeds, and that the engine may accordingly be started, as is sometimes convenient or necessary, by the momentum of the vehicle when it is rolling freely, or by towing the same, whereas arm 180, except for the swingability thereof by the pin 182, would prevent or delay the engagement of clutches 52—55 under such conditions.

While it will be apparent that the illustrated embodiments of my invention herein disclosed are well calculated to adequately fulfill the objects and advantages of my invention, it is to be understood that the invention is susceptible to variation, modification and change within the spirit and scope of the subjoined claims.

What I claim is:

1. In combination with an internal combustion engine having an intake manifold, an element drivable by said engine, an automatic transmission interposed between the engine and drivable element for changing the relative torque ratio therebetween, regulatable means for varying the torque ratio through said transmission, speed-responsive governor means for automatically controlling said regulating means, pressure-responsive means connected to said intake manifold including a pressure chamber portion and a movable element therewithin, mechanical connection between said movable element and the governor means, said element being movable to oppose a decrease of torque ratio and destroy the full effectiveness of the governor means upon a rise of pressure within the manifold, and delaying means preventing instantaneous reversal of movement of said movable element comprising a chambered member of excess capacity arranged between the manifold and pressure chamber and connected to both.

2. In combination with an internal combustion engine having a portion within which pressure variances occur in response to variations of relative torque demand thereupon, and variable ratio torque converting means for changing the effective torque output thereof, a shiftable element for controlling the ratio of the torque converting means, automatic means including a speed re-responsive centrifugal governor for moving said shiftable element in opposite directions, and a pressure-operable element normally opposing movement of said shiftable element only in its travel in a direction toward a position of reduced relative torque ratio, said element being movable by the relative pressure within said portion of the engine, when it is sufficiently reduced, to a position of non-interference with automatic shifting of said shiftable element under the influence of said automatic means.

3. In combination with a prime mover having a portion within which pressure variances occur in response to changes of relative torque demand thereupon, an automatic transmission for varying the effective torque output of the prime mover, including ratio changing means and a shiftable element for controlling the same, automatic means including a speed-responsive centrifugal governor for moving said shiftable element in opposite directions and tending to decrease the relative torque ratio responsively to increasing speeds, biasing means including a spring-pressed blocking arm normally opposing movement of said element toward the reduced torque ratio position when positive pressures exist within said portion of the prime mover, but allowing independent movement of said element in the opposite direction toward higher torque ratio positioning, and offsetting means including a pressure-operable motor connected to said portion of the prime mover and to said blocking arm to move the latter against spring pressure and reduce the effectiveness of said biasing means with the sufficient reduction of pressure within said portion of the prime mover.

4. In combination with a prime mover having a portion within which pressure variances occur in response to changes of relative torque demand thereupon, an automatic transmission incorporating a reverse drive and forward drives of variant ratios, a shiftable element for changing the effectiveness of said ratios, speed-responsive governor means for moving said shiftable element, a pressure operable element for blocking movement of said shiftable element responsively to predetermined pressure change within said portion of the engine, and means for moving said pressure operable element out of blocking position when the forward drives are rendered inoperative.

5. In combination with an internal combustion engine having a portion within which pressure variances occur in response to changes of relative torque demand thereupon, an automatic transmission incorporating a reverse drive and forward drives of variant ratios, a shiftable element for changing the effectiveness of said ratios, a centrifugal governor for moving said shiftable element in response to speed variations, pressure-operable means connected to said portion of the engine within which pressure variances occur and having a portion biased to oppose movement of the shiftable element in the direction in which movement thereof is induced by the governor under increasing speeds, said means being movable out of blocking position by decrease of pressure in said portion of the engine, and by discontinuance of forward drive.

6. In combination with a prime mover having a portion within which pressure variances occur responsively to changing relative power demands thereupon, an automatic transmission including torque converting means of variable ratio, means including a shiftable element for controlling the torque converting means, yieldable means for automatically shifting said element, pressure-operable means connected to said portion of the prime mover and including a blocking member movable in and longitudinally of the path of movement of said shiftable element and arranged to yieldably oppose movement of said shiftable element in one direction only, and at such time to cooperate with said yieldable means to modify its controlling effect upon said torque converting means.

7. In combination with a prime mover having a portion within which pressure variances occur responsively to changing relative power demands thereupon, an automatic transmission including torque converting means, means including a shiftable element for changing the effective ratio of the torque converting means, actuating means for yieldably urging said element in either of two directions including speed responsive governor means, and counter-actuating means opposing the effort of said governor means, pressure-operable means connected to said portion of the prime mover and including a blocking member movable in and longitudinally of the path of movement of said shiftable element and arranged to yieldably oppose movement of said element in one direction only, said blocking member being movable by decrease of pressure in said portion of the prime mover in the direction of movement of the shiftable member when influenced by increasing speed, to thereby free said member for movement in either direction.

8. In combination with a prime mover having a portion within which pressure variances occur in response to changing relative power demands thereupon, an automatic transmission connected to said prime mover including torque converting means of variable ratio for controlling the torque output of said motor, driving and driven members, an element shiftable to vary the effective torque ratio of the transmission, speed responsive governing means for said torque converting means connected to said shiftable element to move the same to a lower torque ratio position upon increase of speed of one of said members, a blocking arm movable in and longitudinally of the path of movement of said element, spring means resisting movement of the arm in the direction in which the shiftable element is urged by speed increase, said spring means normally urging said arm against said element to resist similar movement of the latter, and pressure-operable means connected to said portion of the prime mover within which pressure variances occur, and to said blocking arm, and arranged to move the arm against the effort of the spring means and free the shiftable element for movement in either direction, upon a sufficient decrease of pressure in said portion of the prime mover.

RUSH E. LASSITER.